United States Patent
Okuyama et al.

(10) Patent No.: US 12,052,705 B2
(45) Date of Patent: Jul. 30, 2024

(54) BASE STATION AND TRANSMISSION METHOD

(71) Applicant: NTT DOCOMO, INC., Tokyo (JP)

(72) Inventors: Tatsuki Okuyama, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/040,152

(22) PCT Filed: Mar. 22, 2019

(86) PCT No.: PCT/JP2019/012187
§ 371 (c)(1),
(2) Date: Sep. 22, 2020

(87) PCT Pub. No.: WO2019/182135
PCT Pub. Date: Sep. 26, 2019

(65) Prior Publication Data
US 2021/0022153 A1    Jan. 21, 2021

(30) Foreign Application Priority Data
Mar. 23, 2018 (JP) .................. 2018-056837

(51) Int. Cl.
*H04W 72/121* (2023.01)
*H04B 7/022* (2017.01)
(Continued)

(52) U.S. Cl.
CPC ........ *H04W 72/121* (2013.01); *H04B 7/0413* (2013.01); *H04W 16/28* (2013.01)

(58) Field of Classification Search
CPC ... H04W 72/121; H04W 16/28; H04B 7/0413
(Continued)

(56) References Cited

U.S. PATENT DOCUMENTS

2010/0034108 A1* 2/2010 Ode .................. H04W 72/085
370/252
2010/0284351 A1* 11/2010 Liang .................. H04B 7/0639
370/329

(Continued)

FOREIGN PATENT DOCUMENTS

EP         2190130 A1    5/2010
JP      2010-537599 A   12/2010
(Continued)

OTHER PUBLICATIONS

Extended European Search Report issued in counterpart European Patent Application No. 19770387.9, mailed on Mar. 31, 2021 (7 pages).

(Continued)

*Primary Examiner* — Xuan Lu
(74) *Attorney, Agent, or Firm* — Osha Bergman Watanabe & Burton LLP (57) ABSTRACT

Deterioration in communication characteristics is prevented by performing scheduling in which movement/stillness of user terminals is taken into consideration. Received-power measurement section 103 measures the power of a reference signal from each of the user terminals. Movement/stillness determination section 104 determines whether each of the user terminals is a moving terminal or an unmoving terminal based on over-time variations in received power at transmission points for each of the user terminals. Group selection section 105 groups the user terminals into a moving terminal group and an unmoving terminal group, and selects one of the groups as a signal-transmission target. Transmission control section 108 performs open-loop signal processing without precoding when the moving terminal group is selected, or performs closed-loop signal processing with precoding when the unmoving terminal group is selected.

7 Claims, 6 Drawing Sheets

(51) Int. Cl.
*H04B 7/0413* (2017.01)
*H04B 7/06* (2006.01)
*H04W 16/28* (2009.01)

(58) Field of Classification Search
USPC .......................................................... 370/329
See application file for complete search history.

(56) References Cited

U.S. PATENT DOCUMENTS

| | | | |
|---|---|---|---|
| 2011/0007685 A1* | 1/2011 | Ma ....................... | H04B 7/0639 370/329 |
| 2012/0128084 A1* | 5/2012 | Aguirre ................. | H04W 36/32 370/329 |
| 2012/0275387 A1* | 11/2012 | Xing ...................... | H04L 1/0643 370/328 |
| 2013/0286959 A1* | 10/2013 | Lou ....................... | H04W 72/04 370/329 |
| 2016/0173183 A1* | 6/2016 | Kang .................... | H04B 7/0691 455/562.1 |
| 2016/0211895 A1* | 7/2016 | Onggosanusi .... | H04L 25/03955 |
| 2016/0294453 A1* | 10/2016 | Truong ................ | H04B 7/0691 |
| 2017/0310375 A1* | 10/2017 | Kim ..................... | H04B 7/0478 |
| 2017/0367105 A1* | 12/2017 | Kim .................... | H04W 72/1289 |
| 2019/0020505 A1* | 1/2019 | Hoffman ............. | H04L 25/0228 |
| 2019/0074870 A1 | 3/2019 | Okuyama et al. | |
| 2019/0254044 A1* | 8/2019 | Geraci .............. | H04W 72/1231 |
| 2020/0231124 A1* | 7/2020 | Salter ...................... | G01S 11/06 |

FOREIGN PATENT DOCUMENTS

| | | | |
|---|---|---|---|
| WO | 2008/053550 A1 | 5/2008 | |
| WO | 2017/154739 A1 | 9/2017 | |
| WO | WO-2018039527 A1 * | 3/2018 | ........... H04B 17/309 |

OTHER PUBLICATIONS

International Search Report issued in PCT/JP2019/012187 mailed on Jun. 4, 2019 (8 pages).
Written Opinion of the International Searching Authority issued in PCT/JP2019/012187 mailed on Jun. 4, 2019 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
European Office Action issued in counterpart European Patent Application No. 19770387.9, mailed on Sep. 7, 2022 (6 pages).
Office Action issued in counterpart Japanese Patent Application No. 2020-507948 mailed on Jan. 31, 2023 (10 pages).

* cited by examiner

TIME : t

|      | UE#1      | UE#2      | UE#3      |
|------|-----------|-----------|-----------|
| TP#1 | $P_{1,1}$ | $P_{1,2}$ | $P_{1,3}$ |
| TP#2 | $P_{2,1}$ | $P_{2,2}$ | $P_{2,3}$ |
| TP#3 | $P_{3,1}$ | $P_{3,2}$ | $P_{3,3}$ |
| TP#4 | $P_{4,1}$ | $P_{4,2}$ | $P_{4,3}$ |

TIME : t + Δt

|      | UE#1      | UE#2      | UE#3       |
|------|-----------|-----------|------------|
| TP#1 | $P_{1,1}$ | $P_{1,2}$ | $P'_{1,3}$ |
| TP#2 | $P_{2,1}$ | $P_{2,2}$ | $P'_{2,3}$ |
| TP#3 | $P_{3,1}$ | $P_{3,2}$ | $P'_{3,3}$ |
| TP#4 | $P_{4,1}$ | $P_{4,2}$ | $P'_{4,3}$ |

BASE STATION AND TRANSMISSION METHOD

TECHNICAL FIELD

The present invention relates to a base station and a transmission method.

BACKGROUND ART

Long Term Evolution (LTE) has been specified for achieving a higher data rate, lower latency, and the like in a Universal Mobile Telecommunication System (UMTS) network (see Non-Patent Literature (hereinafter referred to as "NPL") 1). Future systems of LTE have also been studied for achieving a broader bandwidth and a higher speed based on LTE. Examples of future systems of LTE include the systems called LTE-Advanced (LTE-A), Future Radio Access (FRA), 5th generation mobile communication system (5G), 5G plus (5G+), New Radio Access Technology (New-RAT), and the like.

In a future radio communication system (for example, 5G), the use of Massive MIMO (Multiple Input Multiple Output) using a large number of antenna elements (for example, 100 elements or more) in a high frequency band (for example, 4 GHz or higher) has been studied to further increase the speed and reduce the interference in signal transmission. A radio communication system based on an ultra high-density distributed antenna system including a transmission point provided with one or more antenna elements and a signal processing device has also been studied (see, e.g., NPL 1).

There are a large number of user terminals with respect to a large number of transmission points in the ultra high-density distributed antenna system, in which practically unmoving user terminals (hereinafter, referred to as "unmoving terminals") and moving user terminals (hereinafter referred to as "moving terminals") exist together. To achieve high-speed and high-capacity communications in the ultra high-density distributed antenna system, it is necessary for a base station to perform scheduling to multiplex a plurality of user terminals.

CITATION LIST

Non-Patent Literature

NPL 1
3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

However, there has been no extensive study until now on a method for performing scheduling in which movement/stillness of user terminals is taken into consideration. In a case where channel estimation is performed for scheduling without taking into consideration the movement/stillness of the user terminals, there is a possibility that it becomes impossible to achieve high-speed and high-capacity communications since the movement of a user terminal would cause propagation channel to vary so as to deteriorate communication characteristics of MIMO transmission.

An object of the present disclosure is to provide a technique of performing scheduling in which movement/stillness of user terminals is taken into consideration, so as to prevent deterioration in communication characteristics in a communication environment in which a moving terminal and an unmoving terminal exist together.

Solution to Problem

A base station of the present disclosure includes: a plurality of radio transceivers each of which includes at least one antenna element and transmits or receives radio signals to or from a plurality of user terminals; and a control circuit that groups the plurality of user terminals into a plurality of groups based on an over-time variation in received power of each of the radio signals received by the plurality of radio transceivers, and performs scheduling for at least one of the plurality of user terminals belonging to one of the plurality of groups, the at least one user terminal being a signal-transmission-target user terminal.

A transmission method of the present disclosure is a method for transmission of a radio signal by a base station, and includes: measuring received power of a radio signal transmitted from each of a plurality of user terminals and received by a plurality of radio transceivers; grouping the plurality of user terminals into a plurality of groups based on over-time variations in the received power; selecting one of the plurality of groups; performing scheduling for at least one of the plurality of user terminals belonging to the selected group, the at least one user terminal being a signal-transmission-target user terminal; and transmitting a radio signal to the signal-transmission-target user terminal according to the scheduling.

Advantageous Effects of Invention

According to the present disclosure, it is possible to perform scheduling in which movement/stillness of user terminals is taken into consideration, so as to prevent deterioration in communication characteristics even in a communication environment in which a moving terminal and an unmoving terminal exist together.

DESCRIPTION OF EMBODIMENTS

Hereinafter, an embodiment of the present disclosure will be described with reference to the accompanying drawings.

[Configuration of Radio Communication System]

Figure 1:
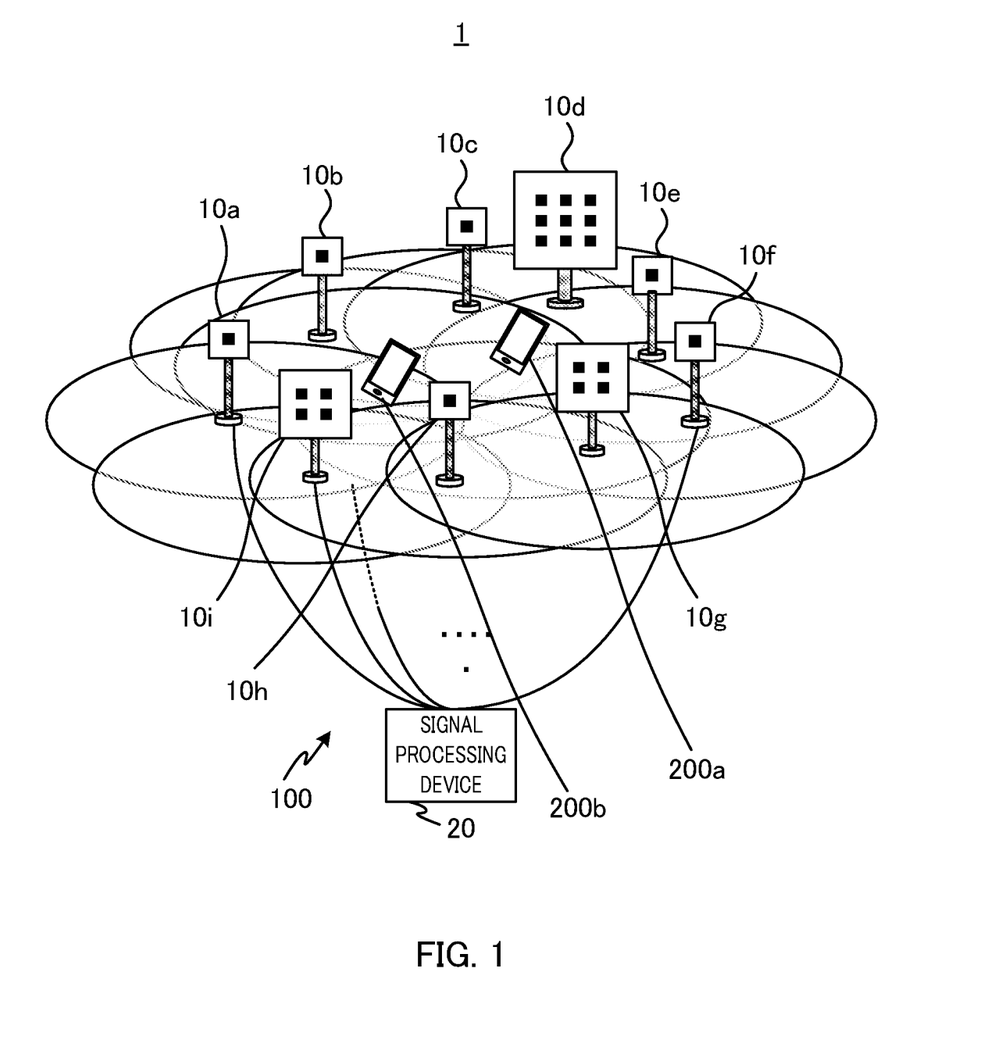
FIG. 1 illustrates an example of a configuration of a radio communication system.

FIG. 1 illustrates an example of a configuration of a radio communication system according to the present embodiment. Radio communication system 1 illustrated in FIG. 1 is an ultra high-density distributed antenna system, for example, and includes: base station (also referred to as "radio base station" or "gNB") 100 including a plurality of transmission points 10a to 10i and signal processing device 20; and at least one user terminal (also referred to as "radio terminal" or "User Equipment (UE)") 200.

Note that, reference signs such as those in "transmission points 10a to 10i," "user terminal 200a," and "user terminal 200b" may be used to describe elements of the same kind while distinguishing them from one another, and common numbers of the reference signs such as those in "transmission point(s) 10" and "user terminal(s) 200" may be used to describe the elements of the same kind without distinguishing them from one another.

Each of transmission points 10a to 10i includes one or more antenna elements. Each of transmission points 10a to 10i is connected to signal processing device 20. Additionally, cells formed respectively by transmission points 10a to 10i overlap one another as illustrated in FIG. 1, for example.

For example, base station 100 wirelessly communicates with user terminals 200a and 200b located under (e.g., within the cells of) transmission points 10a to 10i in FIG. 1. For example, base station 100 selects at least one transmission point 10 from transmission points 10a to 10i depending on the movements of user terminals 200, and selected transmission point 10 transmits a signal to user terminal 200.

Signal processing device 20 performs signal processing of the signal to be transmitted to user terminal 200. The signal subjected to the signal processing is output to at least one of transmission points 10a to 10i, and is transmitted wirelessly to user terminal 200. Signal processing device 20 also receives, from each of transmission points 10a to 10i, a signal received by transmission points 10a to 10i from user terminal 200.

A plurality of transmission points 10 (a plurality of antenna elements) and a plurality of user terminals 200 exist in radio communication system 1 illustrated in FIG. 1 as stated above. Signal processing device 20 selects a channel for use in signal transmission from a plurality of channels between a plurality of antenna elements and a plurality of user terminals 200.

Here, in a case where channel estimation is performed for scheduling without taking into consideration the movement/stillness of user terminals, there is a possibility that it becomes impossible to achieve high-speed and high-capacity communications since the movement of a user terminal would cause propagation channel to vary so as to deteriorate communication characteristics of MIMO transmission.

In view of the above possibility, descriptions of one aspect of the present disclosure will be given in relation to a method in which base station 100 prevents deterioration in communication characteristics in the environment in which moving terminals (terminals having a strong effect on the propagation channel variation) and unmoving terminals exist together.

Note that, although FIG. 1 illustrates two user terminals 200, the number of user terminals 200 is not limited to two. For example, one user terminal 200 may exist to be located under transmission points 10a to 10i, or three or more user terminals 200 may exist to be located under transmission points 10a to 10i. Alternatively, no user terminal 200 may exist to be located under any one of transmission points 10a to 10i.

Note also that, the number of transmission points 10 that base station 100 includes is not limited to nine transmission points 10a to 10i, but a different number of transmission points may exist. Note also that, the numbers of antenna elements that each of transmission points 10 includes may be identical to or different from one another.

The transmission points may also be referred to as "radio transceivers," "extension stations," or "Remote Radio Heads (RRHs)." The signal processing device may also be referred to as "Baseb and processing Unit (BBU)."

[Configuration of Base Station]

Figure 2:
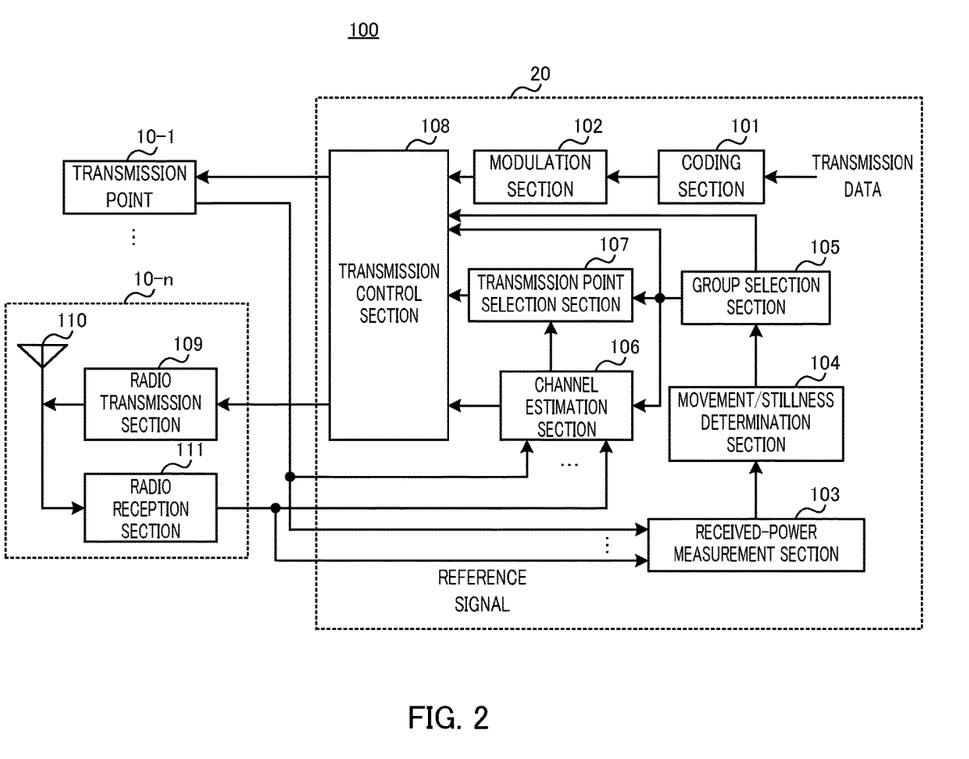
FIG. 2 is a block diagram illustrating an example of a configuration of a base station.

FIG. 2 is a block diagram illustrating an example of a configuration of base station 100. Note that, FIG. 2 illustrates the configuration for downlink data transmission, and illustration of a configuration for uplink data reception is omitted.

Base station 100 illustrated in FIG. 2 includes n transmission points 10 ("n" represents an integer equal to or greater than 1) and signal processing device 20. Transmission points 10a to 10i illustrated in FIG. 1 correspond to transmission points 10-1 to 10-9 in the case of n=9 in FIG. 2.

Signal processing device 20 includes coding section 101, modulation section 102, received-power measurement section 103, movement/stillness determination section 104, group selection section 105, channel estimation section 106, transmission point selection section 107, and transmission control section 108. Each of transmission points 10-1 to 10-n includes radio transmission section 109, antenna 110, and radio reception section 111.

Note that illustration of component sections of base station 100 for generating an Orthogonal Frequency Division Multiplexing (OFDM) signal (e.g., an Inverse Fast Fourier Transform (IFFT) processing section and a Cyclic Prefix (CP) addition section) required, for example, in a case where OFDM transmission is performed and/or the like is omitted in FIG. 2.

Coding section 101 encodes transmission data input to coding section 101, and outputs the encoded transmission data to modulation section 102.

Modulation section 102 modulates the transmission data input from coding section 101, and outputs the modulated transmission data to transmission control section 108.

Reference signals (reference signals for channel estimation) transmitted from user terminals 200 and received by transmission points 10 that base station 100 includes are input to received-power measurement section 103 and channel estimation section 106.

Received-power measurement section 103 measures the power of each of the reference signals (reception signals) from user terminals 200. Note that, received-power measurement section 103 measures the received power at least at two times (at time t and time t+Δt). Then, received-power measurement section 103 outputs a measurement result to movement/stillness determination section 104.

Movement/stillness determination section 104 determines whether each of user terminals 200 is a moving terminal or an unmoving terminal based on over-time variations in received power at the transmission points for each of user terminals 200. Then, movement/stillness determination section 104 outputs a determination result to group selection section 105. Note that, a concrete example of the over-time variations in received power will be described below.

Group selection section 105 performs grouping for distributing each of user terminals 200 into a group of those user terminals 200 determined to be a moving terminal (this group is hereinafter referred to as "moving terminal group")

or a group of those user terminals 200 determined to be a unmoving terminal (this group is hereinafter referred to as "unmoving terminal group"). Group selection section 105 then selects one of the groups as a signal-transmission target. Group selection section 105 then outputs selected group information indicating the selected group to transmission control section 108. Group selection section 105 also outputs selected terminal information indicating user terminals 200 belonging to the selected group to channel estimation section 106, transmission point selection section 107, and transmission control section 108. Note that, the selection criterion for selecting a group as the signal-transmission target is not limited specifically in the present embodiment.

Channel estimation section 106 estimates downlink channels between user terminals 200 indicated in the selected terminal information and transmission points 10 using the reference signals from user terminals 200 indicated in the selected terminal information, and outputs a channel estimation result to transmission point selection section 107 and transmission control section 108. Note that, the Time Division Duplex (TDD) transmission system is used in radio communication system 1 in the present embodiment. Channel estimation section 106 thus can estimate the downlink channels between transmission points 10 and user terminals 200 using the reference signals (that is, uplink signals) transmitted from user terminals 20.

Transmission point selection section 107 (e.g., scheduler) selects transmission points 10 for use in signal transmission to user terminals 200 indicated in the selected terminal information based on the channel estimation result input from channel estimation section 106. Transmission point selection section 107 outputs selected transmission point information indicating selected transmission points 10 to transmission control section 108. Note that, the selection criterion for selecting transmission points 10 is not limited specifically in the present embodiment.

Transmission control section 108 performs, based on the selected transmission point information input from transmission point selection section 107, transmission control on the transmission data input from modulation section 102 (e.g., transmission data addressed to user terminals 200 indicated in the selected terminal information) for transmitting the transmission data using transmission points 10 indicated in the selected transmission point information. Transmission control section 108 then outputs the transmission data and transmission control information (which includes the selected terminal information and the selected transmission point information, for example) to selected transmission points 10.

Transmission control section 108 performs open-loop signal processing without precoding when the selected group information indicates the moving terminal group. On the other hand, when the selected group information indicates the unmoving terminal group, transmission control section 108 generates a precoding matrix using the channel estimation result input from channel estimation section 106, and performs closed-loop signal processing with multiplication of the transmission data by the precoding matrix.

In addition, transmission control section 108 computes a beamforming weight using the channel estimation result input from channel estimation section 106, and performs beamforming using a plurality of antenna elements on the transmission data. Note that, transmission control section 108 may also perform transmission power control on the transmission data for user terminals 200 using the channel estimation result.

Antenna 110 of each of transmission points 10-1 to 10-$n$ includes one or more antenna elements.

Radio transmission section 109 of each of transmission points 10 performs radio transmission processing such as D/A conversion, frequency conversion, amplification, and/or the like on the transmission data (baseband signal) input from transmission control section 108, so as to generate a downlink radio signal. Radio transmission section 109 transmits the generated downlink radio signal via the antenna element (antenna 110).

Radio reception section 111 of each of transmission points 10 performs radio reception processing such as A/D conversion, frequency conversion, and/or the like on an uplink radio signal received from user terminal 200 via antenna 110 (antenna element). Radio reception section 111 outputs the reference signal included in the reception signal subjected to the radio reception processing to received-power measurement section 103 and channel estimation section 106.

[Configuration of User Terminal]

Figure 3:
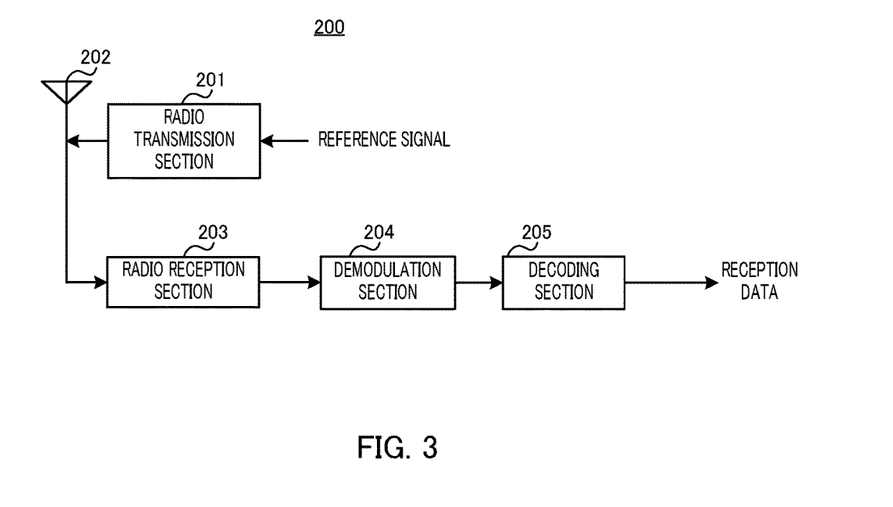
FIG. 3 is a block diagram illustrating an example of a configuration of a user terminal.

FIG. 3 is a block diagram illustrating an example of a configuration of user terminal 200. Note that, FIG. 3 illustrates the configuration for downlink data reception, and illustration of a configuration for uplink data transmission is omitted.

User terminal 200 illustrated in FIG. 3 includes radio transmission section 201, antenna 202, radio reception section 203, demodulation section 204, and decoding section 205.

Note that, illustration of component sections of user terminal 200 for receiving the OFDM signal (e.g., CP removal section and FFT processing section) and/or the like is omitted in FIG. 3.

Radio transmission section 201 performs radio transmission processing such as D/A conversion, frequency conversion, amplification, and/or the like on a reference signal input to radio transmission section 201, so as to generate an uplink radio signal, and radio transmission section 201 transmits the generated uplink radio signal via antenna 202.

Antenna 202 includes one or more antenna elements.

Radio reception section 203 performs radio reception processing such as A/D conversion, frequency conversion, and/or the like on a downlink radio signal received from base station 100 via antenna 202, and outputs the reception signal subjected to the radio reception processing to demodulation section 204.

Demodulation section 204 demodulates the reception signal input from radio reception section 203, and outputs the demodulated signal to decoding section 205.

Decoding section 205 decodes the signal input from demodulation section 204, and outputs reception data.

[Operation of Base Station]

Figure 4:
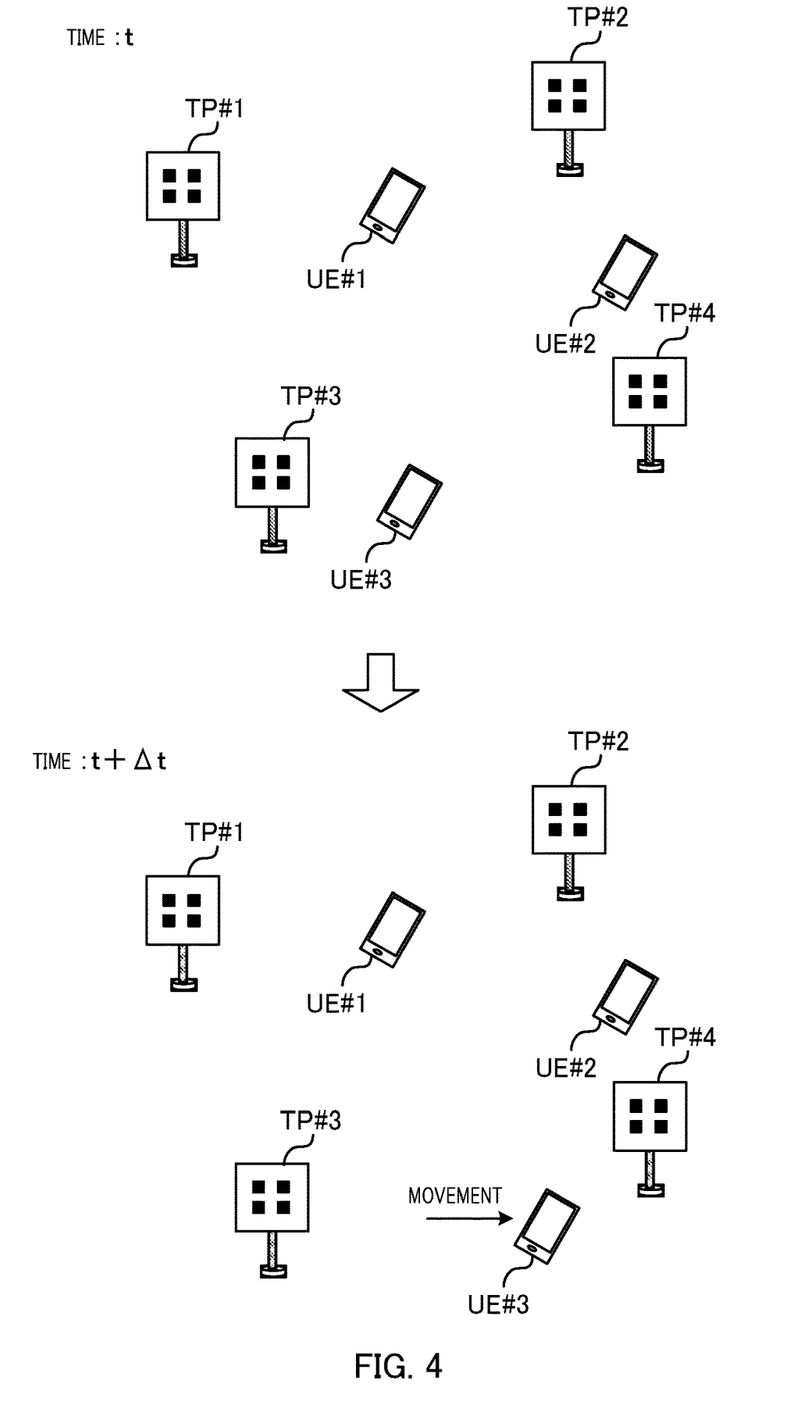
FIG. 4 illustrates an example of transmission points and user terminals in the radio communication system.

Next, an example of operation of base station 100 described above will be described specifically. Hereinbelow, a description will be given by way of an example in relation to a case where radio communication system 1 includes four transmission points 10 (TPs #1 to #4) and three user terminals 200 (UEs #1 to #3), and each of transmission points 10 includes four antenna elements as illustrated in FIG. 4.

Figure 5:
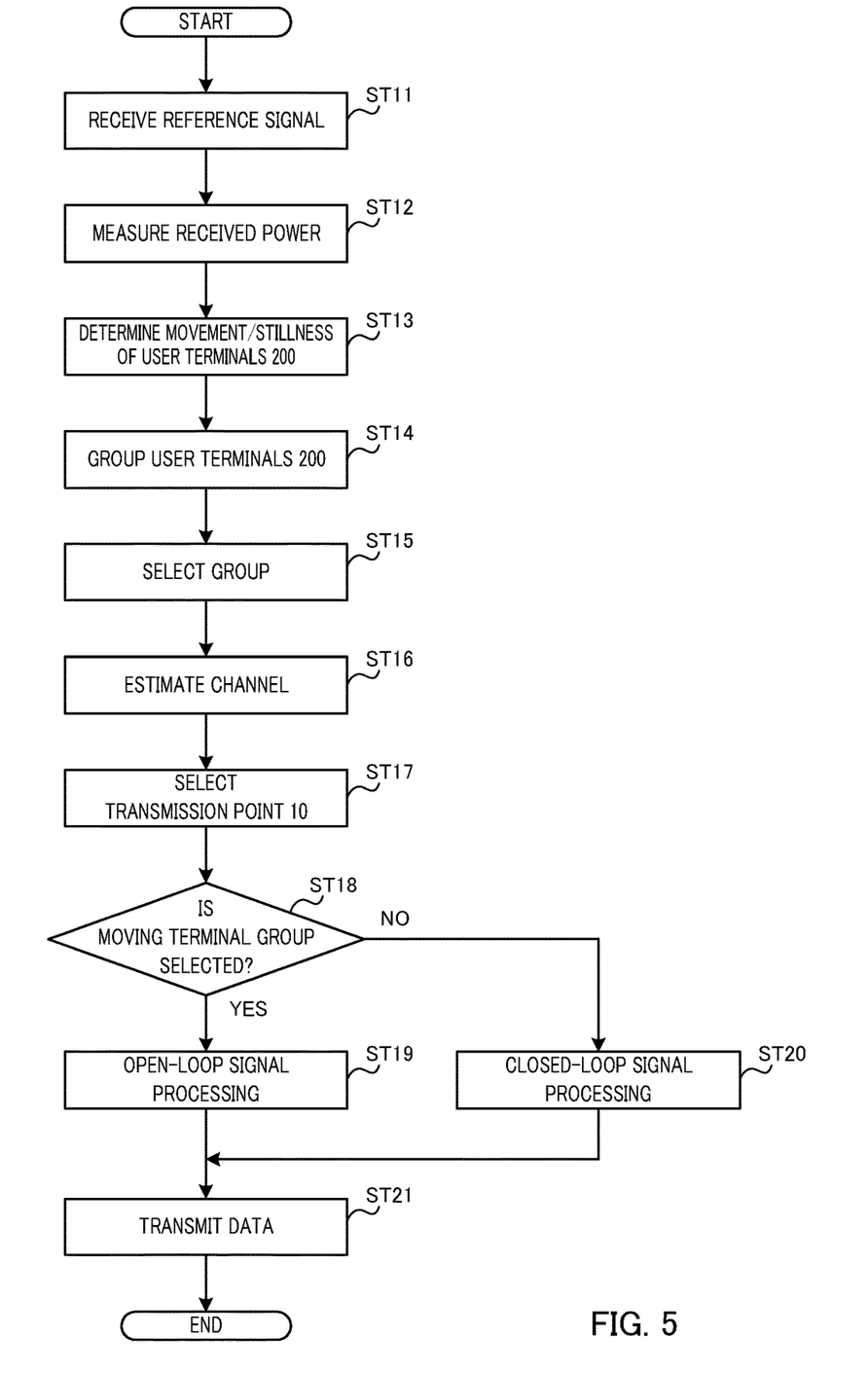
FIG. 5 is a flowchart of an example of operation of the base station.

FIG. 5 is a flowchart illustrating an example of signal transmission processing (e.g., data transmission processing) in base station 100.

Base station 100 receives the reference signals transmitted from user terminals 200 by the antenna elements of a plurality of transmission points 10 (ST11). For example, the reference signals transmitted from UEs #1 to #3 are received by each of TPs #1 to #4.

Figure 6:
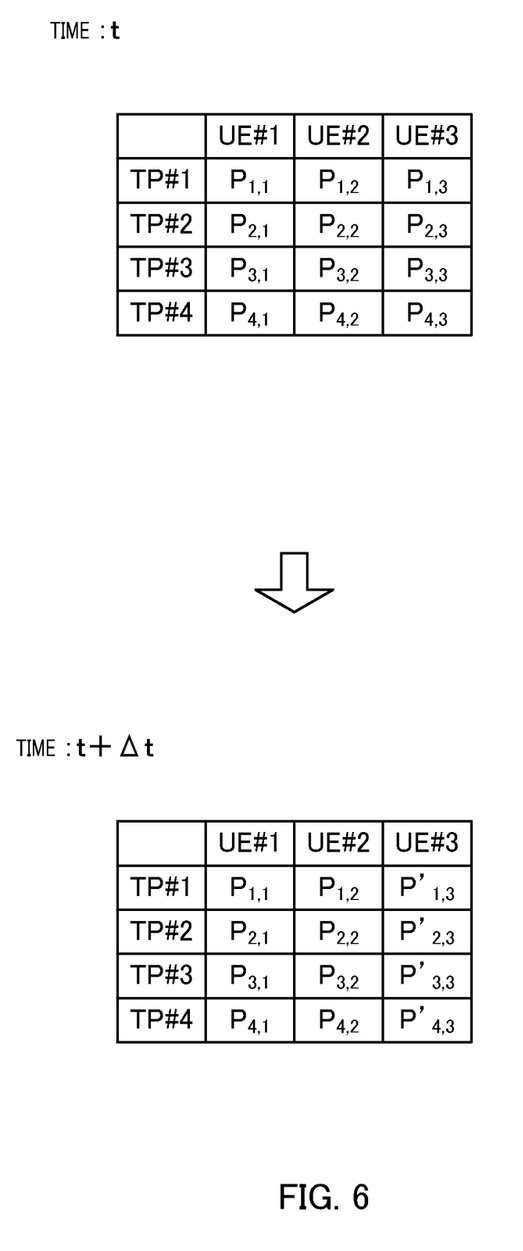
FIG. 6 illustrates an example of received power of each of the user terminals at each of the transmission points in the radio communication system.

Base station 100 measures, for each of transmission points 10, the received power of each of the reference signals received at ST11 (ST12). For example, base station 100 measures received power $P_{x,y}$ between TP #x and UE #y (where x=1 to 4 and y=1 to 3) at time t and time t+Δt as illustrated in FIG. 6.

Base station 100 then determines, as a moving terminal, user terminal 200 for which the over-time variation between received power $P_{x,y}$ at time t and received power $P'_{x,y}$ at time t+Δt is greater than a threshold, and determines, as an unmoving terminal, user terminal 200 for which the over-time variation is equal to or less than the threshold (ST13). For example, when in comparison with received power $P_{1,3}$, received power $P_{2,3}$, received power $P_{3,3}$, and received power $P_{4,3}$ of UE #3 at TPs #1 to #4 at time t, all of received power $P'_{1,3}$, received power $P'_{2,3}$, received power $P'_{3,3}$, and received power $P'_{4,3}$ of UE #3 at TPs #1 to #4 at time t+Δt are varied by an amount greater than the threshold in FIG. 6, base station 100 determines UE #3 to be the moving terminal.

Next, base station 100 groups user terminals 200 into a moving terminal group and an unmoving terminal group (ST14).

Base station 100 then selects one of the groups as the signal-transmission target based on a predetermined selection criterion (ST15). Examples of the selection criterion for selecting a group are as follows: (1) the groups are selected alternately; (2) one of the groups is selected such that equality can be ensured; and (3) one of the groups which is expected to bring about a higher rate in the entire system is selected; and/or the like.

Base station 100 estimates, using the reference signals received at ST11, the downlink channels between those user terminals 200 belonging to the group selected at ST15 and transmission points 10, and generates a channel matrix representing the estimated channels (ST16).

Base station 100 selects, using the channel matrix generated at ST16, transmission points 10 for use in signal transmission (ST17). Examples of the selection criterion for selecting transmission points 10 are as follows: (1) a predetermined number of transmission points 10 are selected in the increasing order of path loss; (2) transmission points 10 whose path losses are less than a threshold are selected; and (3) transmission points 10 at which the received power is greater than a threshold are selected; and/or the like.

Base station 100 performs the signal processing on the transmission data addressed to those user terminals 200 belonging to the group selected at ST15 (ST18, ST19, ST20). Specifically, base station 100 performs the open-loop signal processing without multiplication of the transmission data addressed to user terminals 200 by a precoding matrix when the moving terminal group is selected (ST18: YES) (ST19). On the other hand, when the unmoving terminal group is selected (ST18: NO), base station 100 performs the closed-loop signal processing with multiplication of the transmission data addressed to user terminal 200 by the precoding matrix (ST20).

Base station 100 then performs the data transmission to user terminals 200 selected at ST15 using transmission points 10 selected at ST17 (ST21).

[Variation]

Base station 100 determines whether each of user terminals 200 is a moving terminal or an unmoving terminal based on the over-time variations in received power in the present embodiment (see ST12 and ST13 in FIG. 5). Concrete examples of the over-time variations in received power include: (1) the amount of variation in received power at a specific transmission point; (2) the greatest one of the amounts of variation in received power at a plurality of transmission points; and (3) a total of absolute values of the amounts of variation in received power at a plurality of transmission points; and/or the like.

Additionally or alternatively, although the above descriptions have been given in relation to the case where user terminals 200 are grouped into two groups of the moving terminal group and the unmoving terminal group (see ST14 and ST15 in FIG. 5), the present embodiment is not limited to this case and user terminals 200 may be grouped into three or more groups. For example, user terminals 200 may also be grouped into a first group of those user terminals 200 for which the over-time variations in received power are greater than a first threshold so that their moving speeds are estimated to be high, a second group of those user terminals 200 for which the over-time variations in received power are equal to or less than the first threshold and greater than a second threshold (where the first threshold> the second threshold) so that their moving speeds are estimated to be low while those user terminals 200 are actually moving, and a third group of those user terminals 200 for which the over-time variations in received power are equal to or less than the second threshold so that they are determined to be unmoving. As understood, base station 100 only needs to group a plurality of user terminals 200 into a plurality of groups based on the over-time variations in received power in this embodiment.

Additionally or alternatively, after having selecting one of the groups as the signal-transmission target, base station 100 may further select a predetermined number of user terminals 200 from the user terminals belonging to the selected group by applying predetermined user scheduling in the present embodiment.

Additionally or alternatively, although the above descriptions have been given in relation to the case where base station 100 selects transmission points 10 based on channel estimation values (see ST16 and ST17 in FIG. 5), the present embodiment is not limited to this case and base station 100 may also select an antenna element. Note that, base station 100 may also select a pre-configured number of transmission points 10 or antenna elements in selection of transmission points 10 or the antenna elements.

Additionally or alternatively, base station 100 may adaptively control an interval at which transmission points 10 or the antenna elements are selected depending on the moving speeds of user terminals 200, that is, depending on the sizes of the over-time variations in received power of the selected group in the present embodiment. For example, base station 100 reselects transmission points 10 or the antenna elements at a short interval for a first group of those user terminals 200 whose moving speeds are high, reselects transmission points 10 or the antenna elements at a long interval for a second group of those user terminals 200 whose moving speeds are low, or does not reselect transmission points 10 or the antenna elements for a third group of unmoving user terminals 200. As understood, selection of transmission points 10 or the antenna elements can be efficiently controlled by making shorter the interval at which base station 100 selects transmission points 10 or the antenna elements with increasing moving speeds of user terminals 200.

[Effect]

As described above, base station 100 groups user terminals 200 into a plurality of groups based on the over-time variations in received power of the radio signals transmitted from user terminals 200 and received by transmission points 10. Base station 100 then selects one of the groups as the signal-transmission target, and performs scheduling for user terminals 200 belonging to the selected group.

Accordingly, since base station 100 can perform the scheduling while switching between scheduling only for the moving terminals and scheduling only for the unmoving terminals taking into consideration the movement/stillness of the user terminals, it is possible to prevent deterioration in communication characteristics even in the communication environment in which the moving terminals and the unmoving terminals exist together.

The embodiments of the present disclosure have been described above.

<Hardware Configuration and/or the Like>

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit" or "transmitter." The methods for implementing the functions are not limited specifically as described above.

Figure 7:
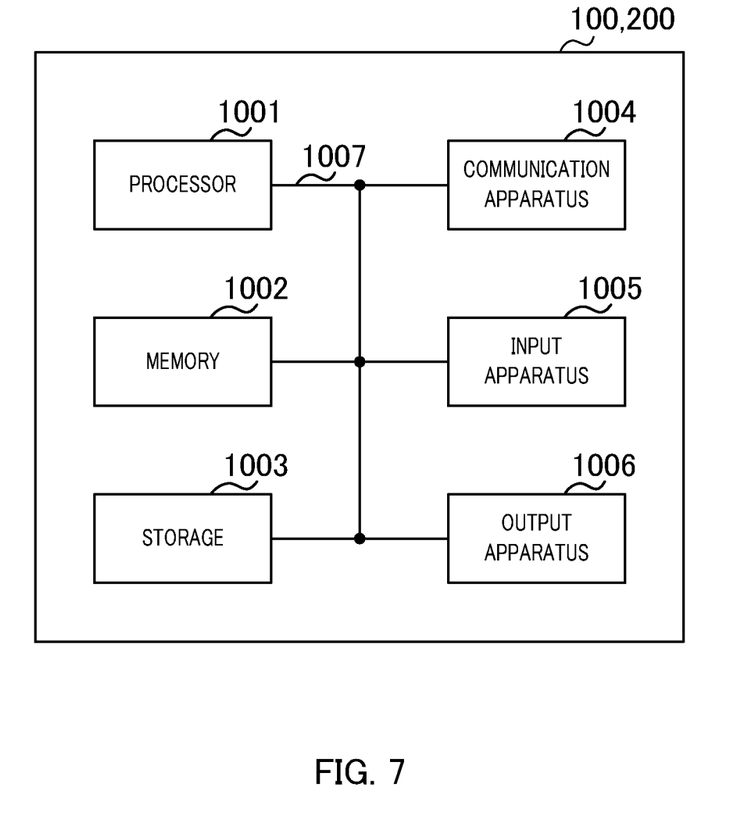
FIG. 7 illustrates an example of hardware configuration of the base station and the user terminal.

For example, the base station, user terminal, and the like according to an embodiment of the present disclosure may function as a computer that executes processing of a radio communication method of the present disclosure. FIG. 7 illustrates an example of a hardware configuration of base station 100 and user terminal 200 according to an embodiment of the present disclosure. Base station 100 and user terminal 200 described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of the base station and of the user terminal may include one or more of the apparatuses illustrated in the drawings or may not include a part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in the base station and user terminal are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, coding section 101, modulation section 102, received-power measurement section 103, movement/stillness determination section 104, group selection section 105, channel estimation section 106, transmission point selection section 107, transmission control section 108, demodulation section 204, decoding section 205, and the like described above may be implemented by processor 1001. In addition, the aforementioned table may be stored in memory 1002.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of the functional blocks constituting the base station and the user terminal may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, radio transmission sections 109 and 201, antennas 110 and 202, radio reception sections 111 and 203, and the like described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, the base station and the user terminal may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

<Notification and Signaling of Information>

The notification of information is not limited to the aspects or embodiments described in the present disclosure, and the information may be notified by another method. For example, the notification of information may be carried out by one or a combination of physical layer signaling (for example, Downlink Control Information (DCI) and Uplink Control Information (UCI)), higher layer signaling (for example, Radio Resource Control (RRC) signaling, Medium Access Control (MAC) signaling, broadcast information (Master Information Block (MIB) and System Information Block (SIB)), and other signals. The RRC signaling may be called an RRC message and may be, for example, an RRC connection setup message, an RRC connection reconfiguration message, or the like.

<Applied System>

The aspects and embodiments described in the present specification may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

<Processing Procedure and the Like>

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

<Operation of Base Station>

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

<Direction of Input and Output>

The information or the like (see the item of "Information and Signals") can be output from a higher layer (or a lower layer) to a lower layer (or a higher layer). The information or the like may be input and output through a plurality of network nodes.

<Handling of Input and Output Information and the Like>

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

<Variations and the Like of Aspects>

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

<Software>

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a web site, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

<Information and Signals>

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

<"System" and "Network">

The terms "system" and "network" used in the present disclosure can be interchangeably used.

<Names of Parameters and Channels>

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements, can be identified by any suitable names, and various names assigned to these various channels and information elements are not limitative in any respect.

<Base Station>

The terms "Base Station (BS)," "radio base station," "fixed station," "NodeB," "eNodeB (eNB)," "gNodeB (gNB)," "access point," "transmission point," "reception point, "transmission/reception point," "cell," "sector," "cell group," "carrier," and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

<Mobile Station>

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

<Base Station/Mobile Station>

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between multiple user terminals (such communication may, e.g., be referred to as device-to-device (D2D), vehicle-to-everything (V2X), or the like). In this case, user terminal 200 may be configured to have the functions that base station 100 described above has. The wordings "uplink" and "downlink" may be replaced with a corresponding wording for inter-terminal communication (for example, "side"). For example, an uplink channel, a downlink channel, and the like may be replaced with a side channel.

Similarly, the user terminal in the present disclosure may be replaced with the base station. In this case, base station 100 is configured to have the functions that user terminal 200 described above has.

<Meaning and Interpretation of Terms>

As used herein, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like hat are non-limiting and non-inclusive examples.

<Reference Signal>

The reference signal can also be abbreviated as RS and may also be called a pilot depending on the applied standard.

<Meaning of "Based On">

The description "based on" used in the present disclosure does not mean "based only on," unless otherwise specified. In other words, the description "based on" means both of "based only on" and "based at least on."

<Terms "First" and "Second">

Any reference to elements by using the terms "first," "second," and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

<"Means">

The "means" in the configuration of each apparatus described above may be replaced with "section," "circuit," "device," or the like.

<Open-Ended Format>

In a case where terms "include," "including," and their modifications are used in the present disclosure, these terms are intended to be inclusive like the term "comprising." Further, the term "or" used in the present disclosure is not intended to be an exclusive or.

<Time Units Such as a TTI, Frequency Units Such as an RB, and a Radio Frame Configuration>

The radio frame may be constituted by one frame or a plurality of frames in the time domain.

The one frame or each of the plurality of frames may be called a subframe in the time domain.

The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms.

Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that are used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

<Maximum Transmit Power>

The "maximum transmit power" described in the present disclosure may mean a maximum value of the transmit power, the nominal UE maximum transmit power, or the rated UE maximum transmit power.

<Article>

In a case where articles, such as "a," "an," and "the" in English, for example, are added in the present disclosure by translation, nouns following these articles may have the same meaning as used in the plural.

<"Different">

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

The present patent application claims the benefit of priority based on Japanese Patent Application No. 2018-056837 filed on Mar. 23, 2018, and the entire content of Japanese Patent Application No. 2018-056837 is hereby incorporated by reference.

INDUSTRIAL APPLICABILITY

One aspect of the present disclosure is useful for a mobile communication system.

REFERENCE SIGNS LIST

1 Radio communication system
10a to 10i, 10-1 to 10-n Transmission point
20 Signal processing device
100 Base station
101 Coding section
102 Modulation section
103 Received-power measurement section
104 Movement/stillness determination section
105 Group selection section
106 Channel estimation section
107 Transmission point selection section
108 Transmission control section
109, 201 Radio transmission section
110, 202 Antenna
111, 203 Radio reception section
200 User terminal
204 Demodulation section
205 Decoding section

The invention claimed is:

1. A base station, comprising:
a plurality of radio transceivers each of which includes at least one antenna element and is configured to receive radio signals including reference signals for channel estimation from a plurality of user terminals; and
a control circuit configured to:
determine, prior to performing scheduling of data transmission, whether each of the plurality of user terminals is a moving terminal or an unmoving terminal based on an over-time variation in received power of each of the reference signals received by the plurality of radio transceivers for each of the plurality of user terminals;
group the plurality of terminals into one of a moving terminal group and an unmoving terminal group, based on whether each of the plurality of terminals is determined to be a moving terminal or an unmoving terminal respectively;
select one of the plurality of groups:
perform the scheduling of data transmission for at least one of the plurality of user terminals belonging to one of the plurality of groups, the at least one user terminal being a signal-transmission-target user terminal;
determine a user terminal among the plurality of user terminals for which the over-time variation is greater than a threshold as a moving terminal, and determine a user terminal among the plurality of user terminals for which the over-time variation is equal to or less than the threshold as an unmoving terminal;
perform open-loop signal processing without precoding on transmission data addressed to at least one of the plurality of user terminals which belongs to the moving terminal group, or perform closed-loop signal processing with precoding by using a precoding matrix generated according to a result of the channel estimation on transmission data addressed to at least one of the plurality of user terminals which belongs to the unmoving terminal group; and
compute a beamforming weight using the result of the channel estimation by the base station using a reference signal from a user terminal and perform beamforming using a plurality of antenna elements on transmission data addressed to any of user terminals which belongs to the moving terminal group by open-loop signal processing and performs beamforming to any of the user terminals which belongs to the unmoving terminal group by closed-loop signal processing,
wherein the plurality of radio transceivers is further configured to transmit data to the signal-transmission-target user terminal according to the scheduling.

2. The base station according to claim 1, wherein
the control circuit is configured to select at least one of the plurality of radio transceivers or at least one of the antenna elements for use in signal transmission to the signal-transmission-target user terminal based on a channel estimation value obtained for a channel between each of the antenna elements of the plurality of radio transceivers and the signal-transmission-target user terminal.

3. The base station according to claim 2, wherein
the control circuit is configured to control, depending on a size of the over-time variation in received power of the selected group, an interval at which the at least one radio transceiver or the at least one antenna element is selected.

4. The base station according to claim 3, wherein the over-time variation is a total of absolute values of amounts of variation in received power at the plurality of radio transceivers.

5. The base station according to claim 2, wherein the over-time variation is a total of absolute values of amounts of variation in received power at the plurality of radio transceivers.

6. The base station according to claim 1, wherein the over-time variation is a total of absolute values of amounts of variation in received power at the plurality of radio transceivers.

7. A method for transmission of a radio signal by a base station, the method comprising:
measuring received power of a reference signal for channel estimation transmitted from each of a plurality of user terminals and received by a plurality of radio transceivers;
determining, prior to performing scheduling of data transmission, whether each of the plurality of user terminals is a moving terminal or an unmoving terminal based on an over-time variation in received power of each of the reference signals received by the plurality of radio transceivers for each of the plurality of user terminals;
grouping the plurality of user terminals into one of a moving terminal group and an unmoving terminal group, based on whether each of the plurality of terminals is determined to be a moving terminal or an unmoving terminal respectively;
selecting one of the plurality of groups;
performing the scheduling of data transmission for at least one of the plurality of user terminals belonging to the selected group, the at least one user terminal being a signal-transmission-target user terminal;
transmitting a radio signal to the signal-transmission-target user terminal according to the scheduling;
determining a user terminal among the plurality of user terminals for which the over-time variation is greater than a threshold as a moving terminal, and to determine a user terminal among the plurality of user terminals for which the over-time variation is equal to or less than the threshold as an unmoving terminal;
performing open-loop signal processing without precoding on transmission data addressed to at least one of the plurality of user terminals which belongs to the moving terminal group, or performing closed-loop signal processing with precoding by using a precoding matrix generated according to a result of the channel estimation on transmission data addressed to at least one of the plurality of user terminals which belongs to the unmoving terminal group; and
computing a beamforming weight using the result of the channel estimation by the base station using a reference signal from a user terminal and perform beamforming using a plurality of antenna elements on transmission data addressed to any of user terminals which belongs to the moving terminal group by open-loop signal processing and performs beamforming to any of the user terminals which belongs to the unmoving terminal group by closed-loop signal processing,
wherein the plurality of radio transceivers is further configured to transmit data to the signal-transmission-target user terminal according to the scheduling.

* * * * *